US011610415B2

(12) United States Patent
Shreve et al.

(10) Patent No.: US 11,610,415 B2
(45) Date of Patent: *Mar. 21, 2023

(54) APPARATUS AND METHOD FOR IDENTIFYING AN ARTICULATABLE PART OF A PHYSICAL OBJECT USING MULTIPLE 3D POINT CLOUDS

(71) Applicant: Palo Alto Research Center Incorporated, Palo Alto, CA (US)

(72) Inventors: Matthew Shreve, Mountain View, CA (US); Sreenivas Venkobarao, Sunderland, MA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/151,415

(22) Filed: Jan. 18, 2021

(65) Prior Publication Data
US 2021/0142039 A1   May 13, 2021

Related U.S. Application Data

(63) Continuation of application No. 16/235,434, filed on Dec. 28, 2018, now Pat. No. 10,896,317.

(51) Int. Cl.
*G06V 20/64* (2022.01)
*G06K 9/62* (2022.01)
(Continued)

(52) U.S. Cl.
CPC ......... *G06V 20/653* (2022.01); *G06K 9/6276* (2013.01); *G06T 17/005* (2013.01);
(Continued)

(58) Field of Classification Search
CPC ... G06T 19/20; G06T 17/005; G06T 2200/04; G06V 10/757; G06V 20/653;
(Continued)

(56) References Cited

U.S. PATENT DOCUMENTS

| 7,164,789 B2 | 1/2007 | Chen et al. |
| 8,452,086 B2 | 5/2013 | Saund et al. |

(Continued)

OTHER PUBLICATIONS

Liu, et al. (A Point Cloud Registration Algorithm Based on Feature Extraction and Matching), pp. 1-10 (Year: 2018).*
(Continued)

*Primary Examiner* — Daniel G Mariam
(74) *Attorney, Agent, or Firm* — Mueting Raasch Group (57) ABSTRACT

An apparatus comprises an input interface configured to receive a first 3D point cloud associated with a physical object prior to articulation of an articulatable part, and a second 3D point cloud after articulation of the articulatable part. A processor is operably coupled to the input interface, an output interface, and memory. Program code, when executed by the processor, causes the processor to align the first and second point clouds, find nearest neighbors of points in the first point cloud to points in the second point cloud, eliminate the nearest neighbors of points in the second point cloud such that remaining points in the second point cloud comprise points associated with the articulatable part and points associated with noise, generate an output comprising at least the remaining points of the second point cloud associated with the articulatable part without the noise points, and communicate the output to the output interface.

20 Claims, 9 Drawing Sheets

(51) Int. Cl.
  *G06T 17/00* (2006.01)
  *G06T 19/20* (2011.01)
  *G06V 10/75* (2022.01)

(52) U.S. Cl.
  CPC ............ *G06T 19/20* (2013.01); *G06V 10/757* (2022.01); *G06T 2200/04* (2013.01)

(58) Field of Classification Search
  CPC ............ G06K 9/00214; G06K 9/6211; G06K 9/6276; G06K 9/6256
  See application file for complete search history.

(56) References Cited

U.S. PATENT DOCUMENTS

| | | | |
|---|---|---|---|
| 9,478,035 | B2 | 10/2016 | Ding et al. |
| 9,858,640 | B1 | 1/2018 | Earl et al. |
| 9,996,737 | B2 | 6/2018 | Shreve et al. |
| 10,217,277 | B2 | 2/2019 | Robert et al. |
| 10,242,282 | B2 | 3/2019 | Loce et al. |
| 2019/0340803 | A1 | 11/2019 | Comer |

OTHER PUBLICATIONS

European Search Report from EP Application No. 19219916.4 dated Mar. 19, 2020, 8 pages.

Fabio, "From Point Cloud to Surface: The Modeling and Visualization Problem", International Workshop on Visualization and Animation of Reality-based 3D Models, vol. 34, 2003, 11 pages.

Funatomi et al., "Pinhole-to-Projection Pyramid Subtraction for Reconstructing Non-rigid Objects from Range Images", IEEE 2012 Second International Conference on 3D Imaging, Modeling, Processing Visualization and Transmission, Oct. 13, 2012, pp. 254-261.

Katz et al., Interactive Segmentation, Tracking, and Kinematic Modeling of Unknown Articulated Objections, Mar. 2012, 22 pages.

Pekelny et al., "Articulated Object Reconstruction and Markerless Motion Capture from Depth Video", Computer Graphics Forum, vol. 27, No. 2, Apr. 2008, pp. 399-408.

Rusu et al., "Fast Point Feature Histograms (FPFH) for 3D Registration", IEEE International Conference on Robotics and Automation, May 12-17, 2009, 6 pages.

Sharma et al., "CSGNet: Neural Shape Parser for Constructive Solid Geometry, Proceedings of the IEEE Conference on Computer Vision and Pattern Recognition", Mar. 31, 2018, 16 pages.

Sturm et al., "Vision-based detection for learning articulation models of cabinet doors and drawers in household environments", IEEE International Conference on Robotics and Automation, May 2010, 7 pages.

Toshev et al., "DeepPose: Human Pose Estimation via Deep Neural Networks", Proceedings of the IEEE Conference on Computer Vision and Pattern Recognition, 2014, 8 pages.

Ye et al., "Accurate 3D Pose Estimation from a Single Depth Image", 2011 IEEE International Conference on Computer Vision, Nov. 6, 2011, pp. 731-738.

* cited by examiner

APPARATUS AND METHOD FOR IDENTIFYING AN ARTICULATABLE PART OF A PHYSICAL OBJECT USING MULTIPLE 3D POINT CLOUDS

RELATED APPLICATIONS

This application is a continuation of U.S. patent application Ser. No. 16/235,434, filed Dec. 28, 2018, to which priority is claimed, and which is incorporated herein by reference in its entirety.

BRIEF SUMMARY

Embodiments of the disclosure are directed to a computer-implemented method comprising obtaining a first three-dimensional point cloud associated with a physical object having at least one articulatable part. The first point cloud is associated with the physical object prior to articulation of the articulatable part. The method comprises obtaining a second three-dimensional point cloud associated with the physical object after articulation of the articulatable part. The method also comprises aligning the first and second point clouds, and finding nearest neighbors of points in the first point cloud to points in the second point cloud. The method further comprises eliminating the nearest neighbors of points in the second point cloud such that remaining points in the second point cloud comprise points associated with the articulatable part and points associated with noise. The method also comprises generating an output comprising at least the remaining points of the second point cloud associated with the articulatable part without the noise points.

Embodiments of the disclosure are directed to an apparatus comprising an input interface and an output interface. The input interface is configured to receive a first three-dimensional point cloud associated with a physical object having at least one articulatable part. The first point cloud is associated with the physical object prior to articulation of the articulatable part. The input interface is also configured to receive a second three-dimensional point cloud associated with the physical object after articulation of the articulatable part. Memory is operably coupled to the input interface and configured to store the first and second point clouds and program code. A processor is operably coupled to the input interface, the output interface, and the memory. The program code, when executed by the processor, causes the processor to align the first and second point clouds, find nearest neighbors of points in the first point cloud to points in the second point cloud, eliminate the nearest neighbors of points in the second point cloud such that remaining points in the second point cloud comprise points associated with the articulatable part and points associated with noise, generate an output comprising at least the remaining points of the second point cloud associated with the articulatable part without the noise points, and communicate the output to the output interface.

The above summary is not intended to describe each disclosed embodiment or every implementation of the present disclosure. The figures and the detailed description below more particularly exemplify illustrative embodiments.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Computer-implemented systems can assist non-expert end-users (e.g., service technicians) to install, configure, and repair a broad array of physical (e.g. electromechanical)

devices by providing direct visual and acoustic cues. For example, computer-implemented systems can provide a structured way of visually stepping an end-user through a complex repair procedure for a particular physical device, such as by use of computer aided design (CAD) models. In many situations, however, CAD models are not available for a particular physical device.

Embodiments of the disclosure are directed to a system and method for generating an approximate CAD model of a physical object with one or more articulated (e.g., movable) parts using commodity 3-dimensional (3D) sensors. Advantageously, approximate CAD models can be quickly generated without the need of an expert engineer or designer. Embodiments of the disclosure are directed to a system and method for identifying one or more articulatable parts of a 3D object using multiple 3D meshes or point clouds generated from commodity 3D sensors. Processing methodologies (e.g., algorithms) of the disclosure do not require knowledge of a complex 3D CAD model. Instead, processing methodologies of the disclosure operate on 3D point clouds of a physical object prior to and after articulation of one or more articulatable parts. Various outputs can be generated, including visual/graphical outputs of the articulatable part(s) (e.g., in annotated form), visual/graphical outputs of the physical object prior to movement of the articulatable part(s) and with the articulatable part(s) shown in their pre-movement position, and visual/graphical outputs of the physical object after movement of the articulatable part(s) and with the articulatable part(s) shown in their post-movement position.

Embodiments are directed to a system and method for identifying articulatable parts of 3D models from point clouds. System and method embodiments can implement a multi-step process which can first perform precise 3D registration of point clouds, followed by an efficient approximate nearest neighbor elimination of correspondences between the point clouds. System and method embodiments can also be implemented to refine the results of the elimination process using a human-in-the-loop approach or algorithmically without human intervention.

The term "articulatable part" as used herein refers to a part or a component of a 3D physical object that is movable (articulatable) between at least two positions relative to the physical object. Generally, an articulatable part is a part or a component that is movably attached or coupled to the physical object, such that the articulatable part remains attached or coupled to the physical object in its articulated position and in its non-articulated position. In some cases, an articulatable part is a part or a component that is attachable to the physical object in its non-articulated position and detachable from the physical object in its articulated position.

Figure 1:
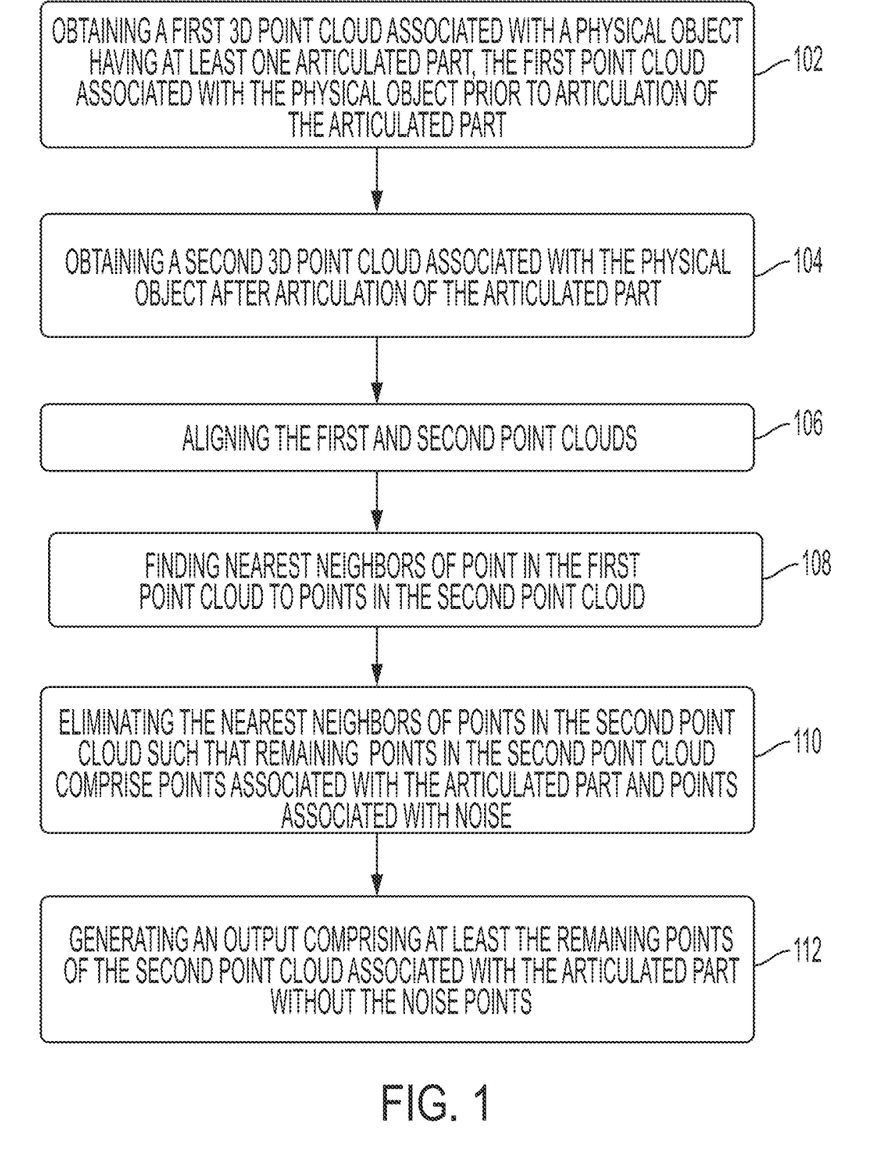
FIG. 1 is a flow diagram illustrating a computer-implemented method for identifying an articulatable part of a physical object using multiple 3D point clouds in accordance with various embodiments.

FIG. 1 is a flow diagram illustrating a computer-implemented method for identifying an articulatable part of a physical object using multiple 3D point clouds in accordance with various embodiments. The method shown in FIG. 1 comprises obtaining 102 a first 3D point cloud associated with a physical object having at least one articulatable part. The first point cloud is associated with the physical object prior to articulation of the articulatable part. The method comprises obtaining 104 a second 3D point cloud associated with the physical object after articulation of the articulatable part. The method also comprises aligning 106 the first and second point clouds. In some embodiments, aligning 106 the first and second point clouds comprises coarsely aligning the first and second point clouds followed by finely aligning the first and second point clouds.

The method comprises finding 108 nearest neighbors of points in the first point cloud to points in the second point cloud. The method also comprises eliminating 110 the nearest neighbors of points in the second point cloud such that remaining points in the second point cloud comprise points associated with the articulatable part and points associated with noise. The method further comprises generating 112 an output comprising at least the remaining points of the second point cloud associated with the articulatable part without the noise points. In various embodiments, the first and second point clouds are obtained using a commodity 3D sensor, such as a commercial 3D scanner.

It is understood that, in the embodiment illustrated in FIG. 1, more than one articulatable part of a physical object can be identified in the manner illustrated in FIG. 1. For example, and with reference to FIG. 2, a physical object can include a plurality of articulatable parts, each of which can be identified in accordance with the methodology shown in FIG. 2. The method of FIG. 2 comprises obtaining 202 a first 3D point cloud associated with a physical object having N articulatable parts, where N is an integer greater than zero. The first point cloud is associated with the physical object prior to articulation of the N articulatable parts. The method comprises obtaining 204 M 3D point clouds associated with the physical object after articulation of each of the N articulatable parts, where M is an integer greater than zero. The method also comprises aligning 206 the first point cloud with each of the M point clouds. In some embodiments, aligning 206 the first and M point clouds comprises coarsely aligning the first and M point clouds followed by finely aligning the first and M point clouds.

Figure 2:
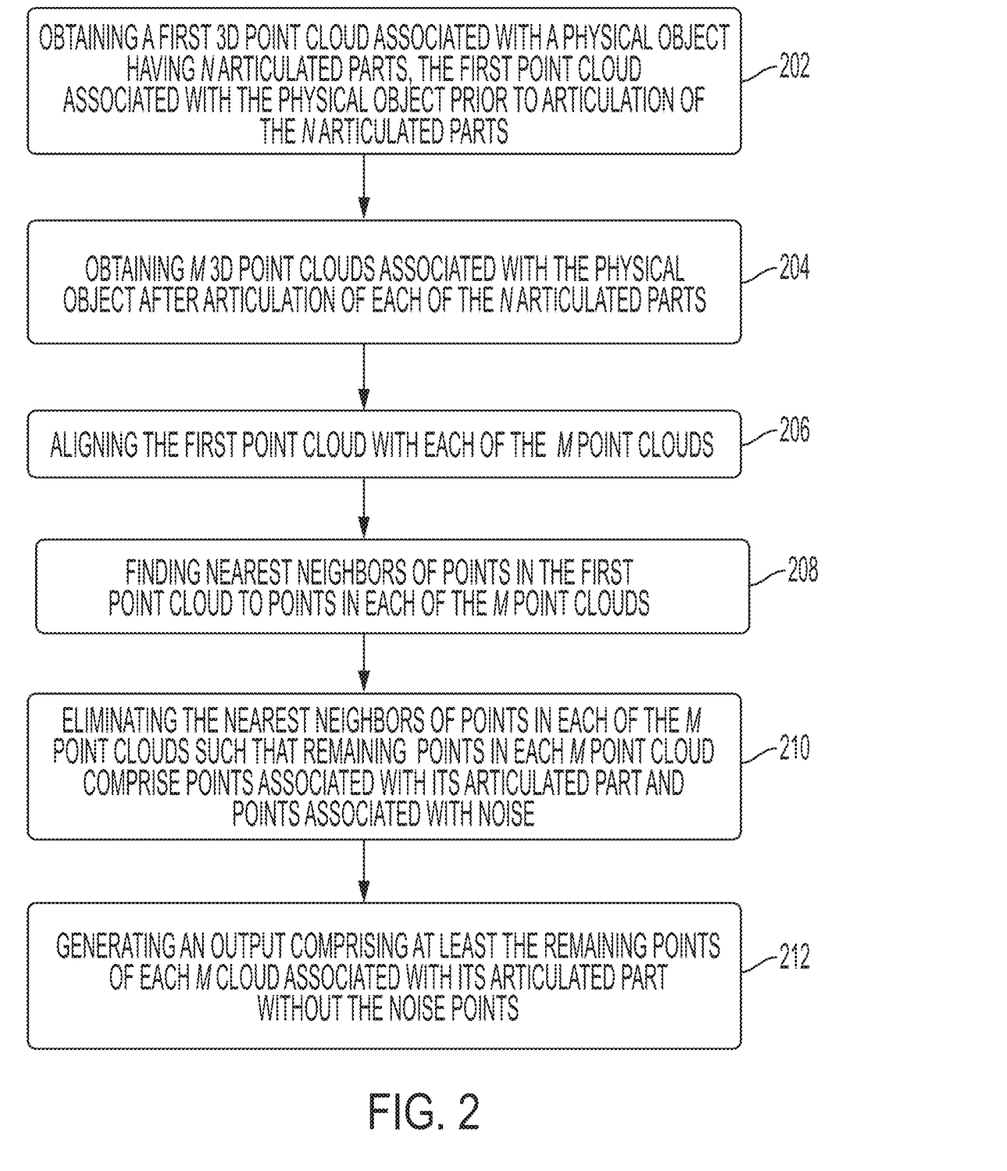
FIG. 2 is a flow diagram illustrating a computer-implemented method for identifying a multiplicity of articulatable parts of a physical object using multiple 3D point clouds in accordance with various embodiments.

The method comprises finding 208 nearest neighbors of points in the first point cloud to points in each of the M point clouds. The method also comprises eliminating 210 the nearest neighbors of points in each of the M point clouds such that remaining points in each M point cloud comprise points associated with its articulatable part and points associated with noise. The method further comprises generating 212 an output comprising at least the remaining points of each M cloud associated with its articulatable part without the noise points. In various embodiments, the first and M point clouds are obtained using a commodity 3D sensor, such as a commercial 3D scanner.

Figure 3:
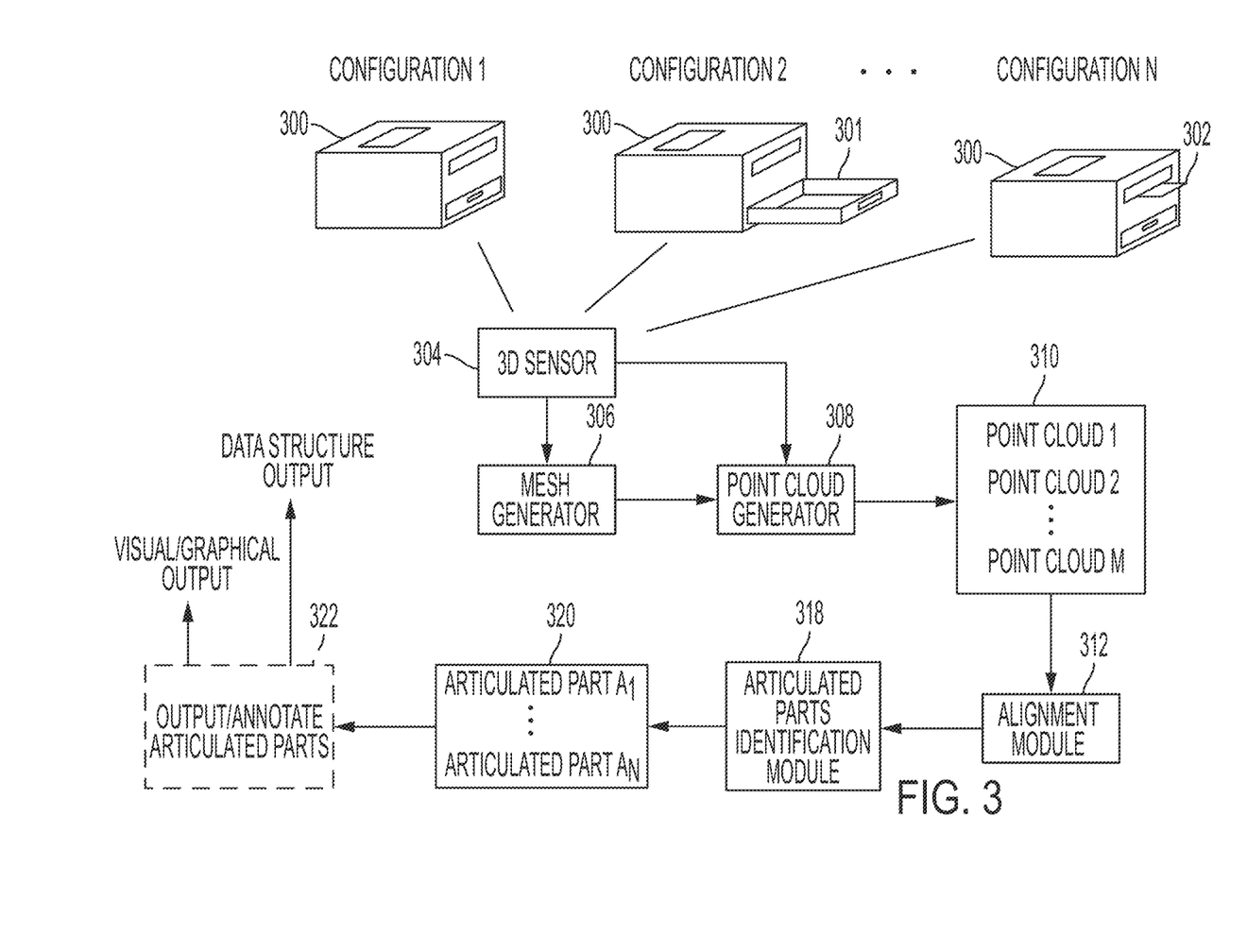
FIG. 3 illustrates a system and method for identifying one or more articulatable parts of a physical object using multiple 3D point clouds in accordance with various embodiments.

FIG. 3 illustrates a system and method for identifying one or more articulatable parts of a physical object using multiple 3D point clouds in accordance with various embodiments. In the embodiment shown in FIG. 3, the representative physical object is a laser printer 300. It is understood that the physical object can represent any 3D object that includes one or more articulatable parts, and that the laser printer 300 of FIG. 3 is shown for non-limiting illustrative purposes. Configuration 1 shows the laser printer 300 prior to articulation of one or more articulatable parts. Configuration 2 shows the laser printer 300 after articulation of a first articulatable part, which is a pull-out paper tray 301 in FIG. 3. Configuration N shows the laser printer 300 after articulation of an N-th articulatable part, which is a pull-out envelop feed tray 302 in FIG. 3. It is understood that the laser printer 300 typically includes several articulatable parts (e.g., toner cartridge drawer, paper tray, envelop feed tray, hinged communication port door, etc.), and that articulation of each of these parts can be represented by a different configuration of printer 300.

As is shown in FIG. 3, a 3D sensor 304 is used to scan the printer 300 in each of its configurations 1-N. The 3D sensor 304 can be a commodity or commercial 3D scanner configured to be used with a smartphone or tablet computing device, examples of which are described hereinbelow. For convenience, the 3D sensor 304 refers to a 3D scanning device in combination with a portable computing device. In practice, a user positions the 3D sensor 340 in proximity to the laser printer 300, and scans the laser printer 300 in each of its configurations 1-N. For example, a first scan is generated by the 3D sensor 304 with the laser printer 300 in its non-articulated configuration (Configuration 1). The first scan results in the production of point cloud1, which is stored in a memory 310. The user pulls out the paper tray 301, which represents a first articulatable part of the laser printer 300 (Configuration 2). A second scan results in the production of point cloud2, which is stored in the memory 310. The user returns the paper tray 301 to its non-articulated position and pulls out the envelope feed tray 302, which represents a second articulatable part of the laser printer 300 (Configuration N). A third scan results in the production of point cloud M, which is stored in the memory 310.

In some embodiments, the 3D sensor 304 includes a mesh generator 306 and a point cloud generator 308. In such embodiments, the mesh generator 306 is configured to generate a mesh as a result of each of the scans. Each mesh is composed of a set of vertices and a set of triangular faces formed by edges connecting the vertices. The point cloud generator 308 is configured to operate on each mesh produced by the mesh generator 306, and extracts a point cloud from each of the meshes. Each point cloud is composed of all the vertices of its corresponding mesh. In other embodiments, the 3D sensor 304 includes the point cloud generator 308, but does not include the mesh generator 306. In such embodiments, the point cloud generator 308 is configured to generate a point cloud resulting from each scan.

Point clouds1-M collected in the memory 310 are processed by an alignment module 312. The alignment module 312 is configured to perform a two-step alignment process, which involves coarse alignment followed by fine alignment of point cloud1 with point clouds2-M. An identification module 318 operates on the aligned point clouds1-M to identify clusters of points belonging to each of the articulatable parts $A_1$-$A_N$ 320 (e.g., paper tray 301, envelope feed tray 302). Having identified each of the articulatable parts $A_1$-AN 320, subsequent processes can be performed, such as outputting and/or annotating 322 the articulatable parts $A_1$-$A_N$ 320. For example, a visual or graphical output can be produced, such as an approximate CAD model of the annotated laser printer 300 showing articulatable parts $A_1$-$A_N$ 320 in annotated form (e.g., different colors, shading, hatching). Alternatively, or in addition, a data structure or information signal can be generated as an output 322 for articulatable parts $A_1$-$A_N$ 320, alone or in combination as the annotated laser printer 300.

Figure 4:
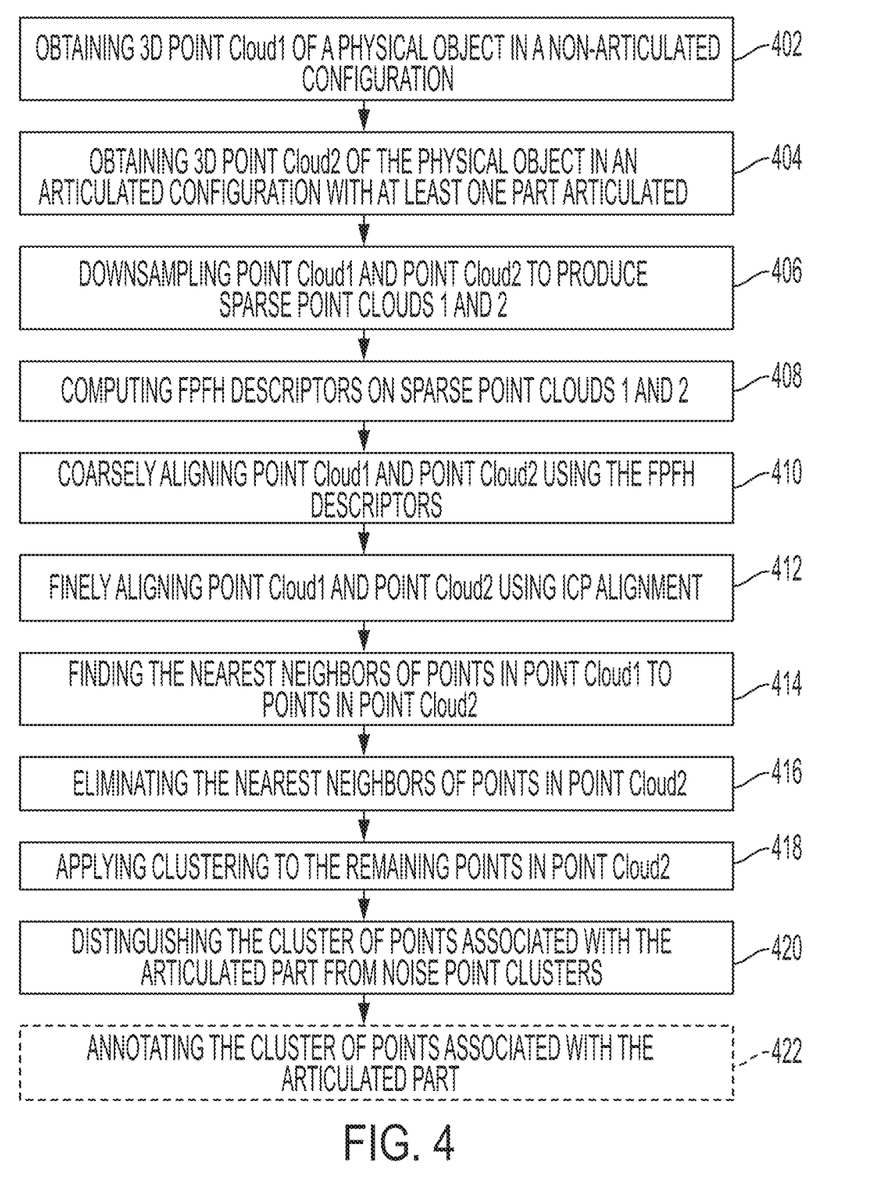
FIG. 4 is a flow diagram illustrating a computer-implemented method for identifying an articulatable part of a physical object using multiple 3D point clouds in accordance with various embodiments.

FIG. 4 is a flow diagram illustrating a computer-implemented method for identifying an articulatable part of a physical object using multiple 3D point clouds in accordance with various embodiments. The method shown in FIG. 4 comprises obtaining 402 a first 3D point cloud (point cloud1) of a physical object in a non-articulated configuration. The method comprises obtaining a second 3D point cloud (point cloud2) of the physical object in an articulated configuration with at least one part articulated. The method also comprises downsampling 406 point cloud1 and point cloud2 to produce sparse point clouds 1 and 2. The method further comprises computing 408 Fast Point Feature Histogram (FPFH) descriptors from sparse point clouds 1 and 2. The method comprises coarsely aligning 410 point cloud1 and point cloud2 using the FPFH descriptors. The method also comprises finely aligning 412 point cloud1 and point cloud2 using ICP alignment. It is noted that downsampling 406 point cloud1 and point cloud2 is optional, and can be performed to increase processing speed.

As is further shown in FIG. 4, the method comprises finding 414 the nearest neighbors of points in point cloud1 to points in point cloud2. The method also comprises eliminating 416 the nearest neighbors of points in point cloud2, and applying 418 clustering to the remaining points in point cloud2. The method further involves distinguishing 420 the cluster of points associated with the articulatable part from noise point clusters. In some embodiments, the distinguishing process 420 comprises receiving a user input that identifies the articulatable part, and distinguishing the cluster of points associated with the articulatable part from noise point clusters in response to the user input. In other embodiments, the distinguishing process 420 comprises algorithmically (e.g., with no user input) distinguishing the cluster of points associated with the articulatable part from noise point clusters. The distinguishing process 420 results in identifying the articulatable part.

In some embodiment, the method comprises annotating 422 the cluster of points associated with the articulatable part, such as by coloring, shading, hatching, or otherwise graphically accentuating the articulatable part. For example, the cluster of points associated with the articulatable part can have a color (or gray scale saturation) that is different from the color (or gray scale saturation) of the physical object. The method can comprise generating an output of the articulatable part, alone or in combination with the physical object, in the form of a graphical output (e.g., on a display), a data structure output (e.g., a data matrix), an information signal, or any combination of these outputs.

The following discussion provides further details illustrating a computer-implemented method for identifying an articulatable part of a physical object using multiple 3D point clouds in accordance with various embodiments. Physical objects can be represented in 2D using images which are essentially pixel values (RGB for example) in a 2-dimensional grid with [X, Y] coordinates. Point clouds are a straightforward extension of this representation to 3D. A physical object can be represented by a set of pixel values whose locations are specified by [X, Y, Z] coordinates. Point clouds allow more variability in the structure of data being processed, unlike images which are always rectangular. Point clouds can also contain exact information about depth, while images are capable of only showing relative depth. As a result, point clouds are versatile and useful representations for understanding object articulation, which can be a modification in 3D of the object's pose.

According to various embodiments, a commercial 3D scanner can be used with a smartphone or tablet device to scan a 3D object and generate multiple point clouds. If an object has k articulable parts, for example, k+1 point clouds are collected using the 3D scanner. In this case, one point cloud of the object with no articulation is collected, and k point clouds with each of the k parts articulated are collected, one at a time. The point cloud with no articulation defines the reference point cloud, which is referred to as point cloud1 for convenience. For clarity of explanation, it is assumed that the 3D object has one articulatable part, it being understood that the 3D object may have any number of articulatable parts. The point cloud with one articulatable part is referred to as point cloud2 for convenience. In point cloud2, it is assumed that the points are extremely close to the corresponding points in point cloud1, except for the region belonging to the articulatable part. With this assumption, a nearest neighbor elimination is performed. For example, if there exists a point [x, y, z] in point cloud1 within a neighborhood radius r of a point [x', y', z'] in point cloud1, then it is assumed that these points are both the same point with minor motion, and [x, y, z] does not belong to the articulatable part.

However, for this assumption to hold, point cloud1 and point cloud2 have to be precisely aligned. This is rarely the case with the noisy reconstruction obtained from 3D scanners. To address this problem, the inventors have developed a method to automatically align point clouds with no user intervention before performing nearest neighbor elimination. Automatic registration of point cloud1 and point cloud2 can be performed by downsampling point cloud1 and point cloud2, computing local descriptors, and finding correspondences based on a threshold criterion for matching.

Figure 5A:
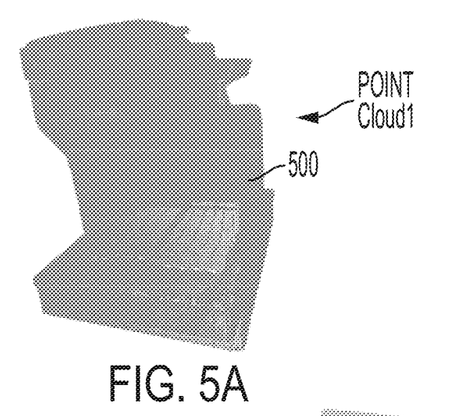
FIGS. 5A-5C are images of point clouds developed from 3D scanning a laser printer in non-articulated and articulated configurations in accordance with various embodiments.
Figure 5B:
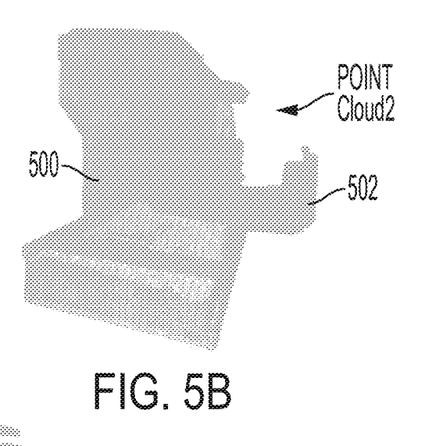
Figure 5C:
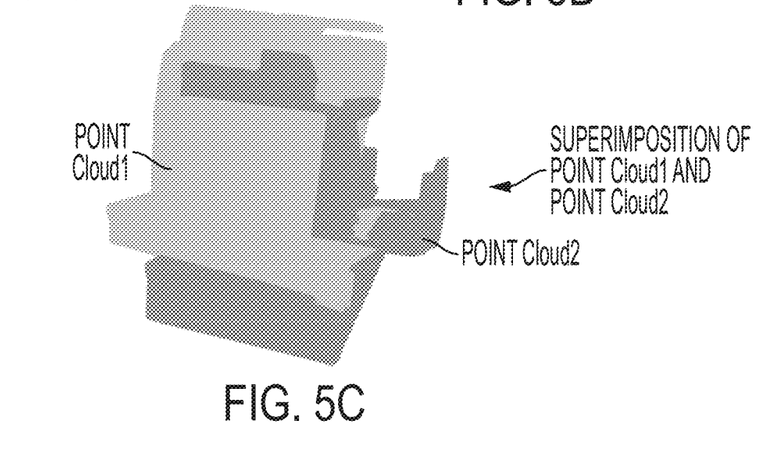

Referring now to FIGS. 5A-5C, these figures are images showing point clouds developed from 3D scanning a laser printer 500. FIG. 5A is an image showing point cloud1 (Pose 1), which serves as the reference point cloud of the laser printer 500 in its non-articulated configuration. FIG. 5B is an image showing point cloud2 (Pose 2), which is the point cloud of the laser printer 500 in its articulated configuration. In particular, an opened front door 502 (e.g., for accessing a toner cartridge) is shown as an articulatable part of the laser printer 500. FIG. 5C is an image showing the superimposition of point cloud1 and point cloud2 (noting a change in the gray scale of point cloud1 and point cloud2 in the superimposition for convenience of explanation). FIG. 5C shows unaligned point cloud1 and point cloud2. According to various embodiments, point cloud1 and point cloud2 are subject to a two-step alignment process. This two-step alignment process involves coarsely aligning point cloud1 and point cloud2 followed by finely aligning point cloud1 and point cloud2. Nearest neighbor elimination and subsequent processes can then be performed on the finely (e.g., precisely) aligned point cloud1 and point cloud2.

According to a representative embodiment, point cloud1 and point cloud2 are downsampled with a voxel size of 0.05 m, such that, along each dimension, one point is chosen in point cloud1 and point cloud2 for every 5 cm. It is understood that the voxel size can be altered as needed or desired. Downsampling point cloud1 and point cloud2 produces sparse point cloud1 and sparse point cloud2. Fast Point Feature Histogram descriptors are computed on sparse point cloud1 and sparse point cloud2. Having computed the FPFH descriptors, the FPFH descriptors are matched across point cloud1 and point cloud2, and then used to align point cloud1 and point cloud2 by estimating a 3D transformation matrix on homogenous coordinates. This 3D transformation matrix is preferably a generalized 4×4 transformation matrix which can handle rotation, scaling, and translation.

In this representative embodiment, the parameters of the 3D transformation matrix are estimated by using a Random Sample Consensus (RANSAC) methodology (e.g., algorithm). The RANSAC methodology uses a sample consensus algorithm to find a set of parameters that yields the fewest outliers according to a specified distance criterion. In this illustrative embodiment, the L2 norm of the transformed points and the reference points is chosen as the distance criterion. If the reference point and the transformed point have an L2 norm below a specified threshold (e.g., 2 mm), the transformed point is treated as an inlier, and otherwise as an outlier.

Due to the sparse FPFH descriptors computed on sparse point cloud1 and sparse point cloud2, the estimated 3D transformation matrix is only a coarse global registration between point cloud1 and point cloud2. As a result, a process to finely align point cloud1 and point cloud2 is implemented. In this representative embodiment, a local refinement is applied using an Iterative Closest Point (ICP) algorithm. The ICP algorithm assumes that nearby points are correspondences, and estimates a transform based on the nearby points. The transformation is then applied, and the correspondences are updated. The objective is once again to minimize the L2 norm between pairs of correspondences. This process is iteratively performed until convergence, such that the average L2 norm does not change between successive iterations.

Figure 6A:
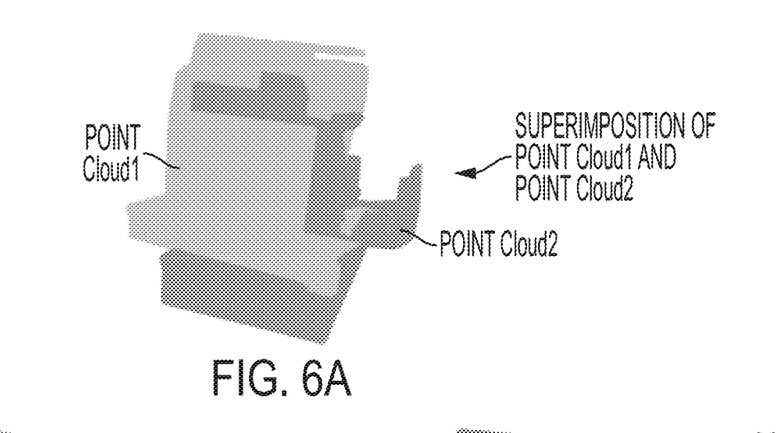
FIG. 6A is an image showing superimposition of unaligned point clouds of a laser printer in non-articulated and articulated configurations in accordance with various embodiments.
Figure 6B:
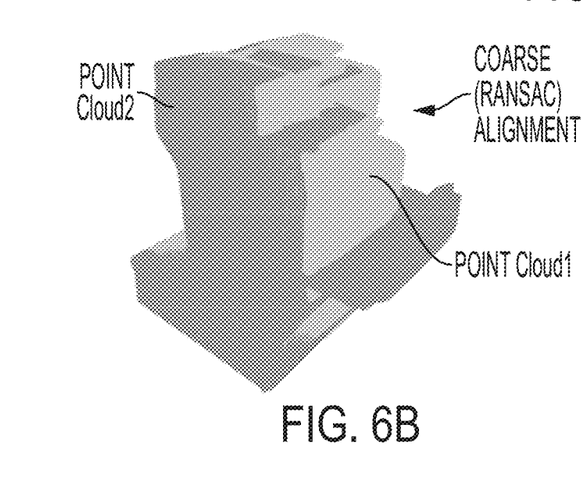
FIG. 6B is an image showing coarse alignment of the point clouds illustrated in FIG. 6A in accordance with various embodiments.
Figure 6C:
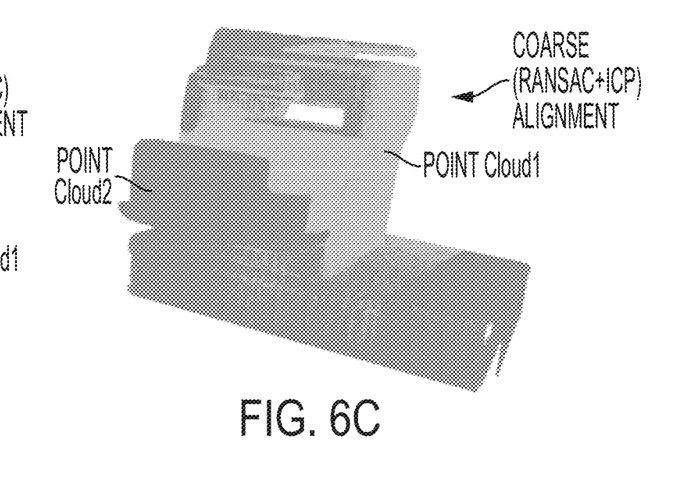
FIG. 6C is an image showing fine alignment of the coarsely aligned point clouds illustrated in FIG. 6B in accordance with various embodiments.

The ICP algorithm is prone to local minima, and as a result, ICP fine alignment cannot be directly used on the un-aligned point cloud1 and point cloud2 (see, e.g., FIG. 5C). However, by initializing ICP with the transformation extracted from the RANSAC process, a local minima is found that is very close to the global minima. FIGS. 6A-6C are images that illustrate the two-step registration process described above. FIG. 6A is an image showing unaligned point cloud1 and point cloud2. FIG. 6B is an image showing coarse alignment of point cloud1 and point cloud2 resulting from RANSAC alignment. FIG. 6C is an image showing fine (e.g., precise) alignment of point cloud1 and point cloud2 resulting from RANSAC and IPC alignment.

As a result of this precise alignment, the stationarity requirement of point cloud1 and point cloud2 is satisfied and nearest neighbor elimination can be performed on finely aligned point cloud1 and point cloud2. Because each of point cloud1 and point cloud2 contains on the order of about $10^5$ to $10^6$ points in this representative embodiment, a naïve nearest neighbor search cannot be performed as it will have a time complexity of $O(N^2)$. Instead, an approximate nearest neighbor search is performed with an efficient data structure. According to this representative embodiment, each of point cloud1 and point cloud2 is represented as a k-d tree (k-dimensional tree). The construction of the k-d tree can be done in $O(N \log N)$ time complexity. Following this, for each point in cloud1, a check is made to determine if there exists a corresponding nearest neighbor in the tree of cloud2 (i.e., some point in cloud2 which is within a neighborhood radius of a point in cloud1).

The worst case time complexity for the range search is $O(kN(1-1/k))$. Here, k=3, which is the number of dimensions, so the search becomes O(N2/3) per point. As a result, the approximate nearest neighbor search over the entire point cloud becomes O(N4/3) (N points, O(N2/3) per point). Points are deleted from point cloud1 and point cloud2 (or, alternatively, point cloud2 only) if the search returns a neighbor. This deletion is $O(\log N)$ per point. Since this is an approximate search, it is not guaranteed to find all nearest neighbors, and due to the artifacts in the point clouds, there may be no nearest neighbors for certain points in the point clouds. As a result, eliminating points produces a messy (noisy) result.

Figure 7A:
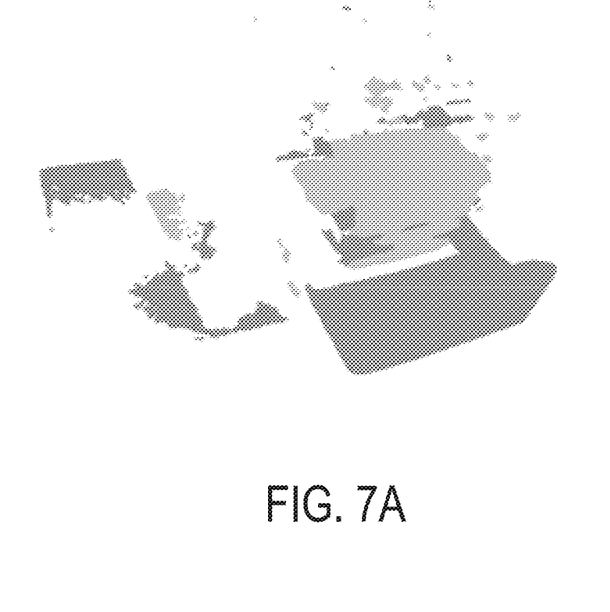
FIGS. 7A and 7B are two images showing views of superimposed point clouds resulting from nearest neighbor elimination in accordance with various embodiments.
Figure 7B:
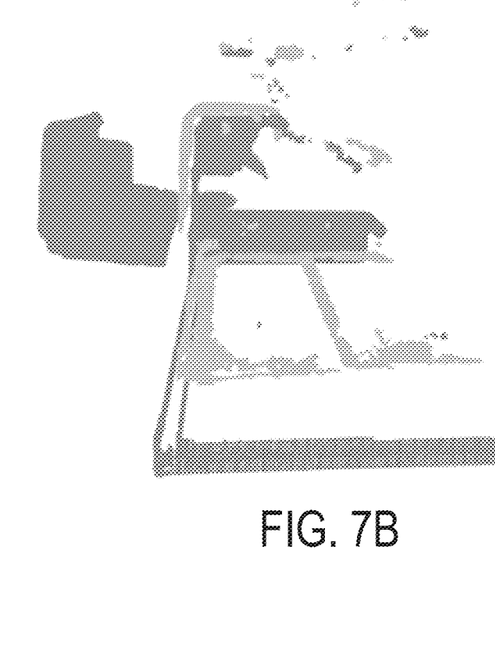

FIGS. 7A and 7B are images showing two views of superimposed point cloud1 and point cloud2 with a point deletion performed by eliminating points from point cloud2 with respect to point cloud1, and vice versa. In FIGS. 7A and 7B, the lighter gray points are remaining points of point cloud1 after point elimination, and the darker gray points are remaining points of point cloud2 after point elimination. To clean up these artifacts, clustering of point cloud1 and point cloud2 is performed after nearest neighbor elimination. For example, density-based spatial clustering of applications with noise (DBSCAN) can be performed on point cloud1 and point cloud2 after nearest neighbor elimination.

Figures 8A, 8B, 8C, 8D:
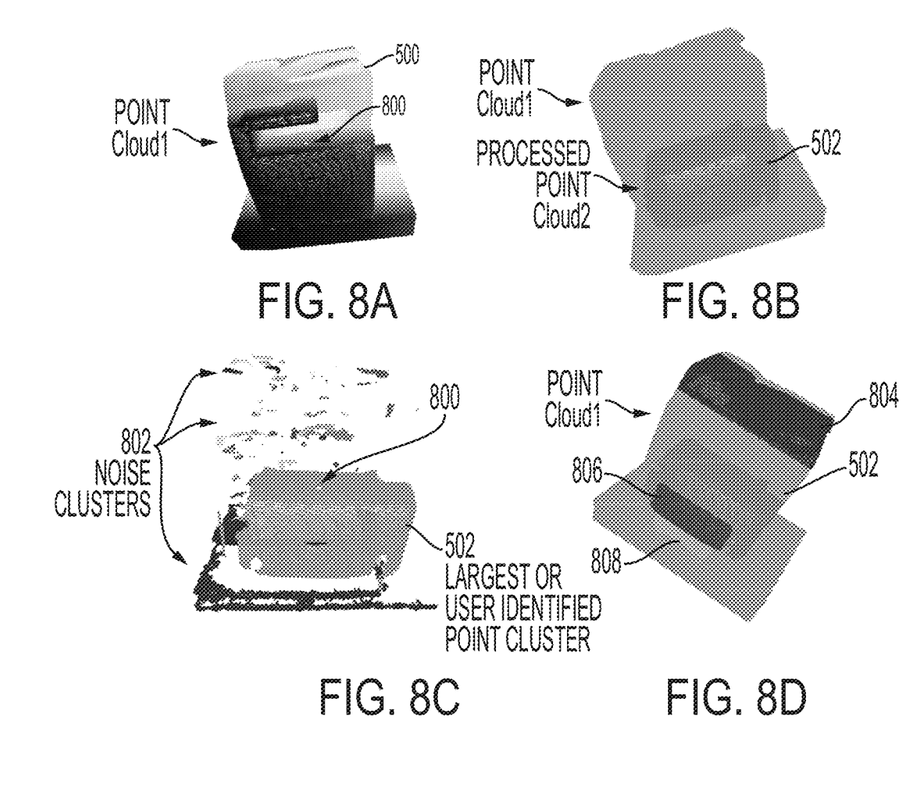
FIG. 8A is an image showing an original point cloud of a laser printer prior to articulation of an articulatable part in accordance with various embodiments.
FIG. 8B is an image showing the result of performing clustering of point clouds after nearest neighbor elimination in accordance with various embodiments.
FIG. 8C is an image showing the remaining points corresponding to the articulatable part after performing clustering of point clouds in accordance with various embodiments.
FIG. 8D is an image showing a point cloud corresponding to a laser printer in a non-articulated configuration annotated with processed point clouds corresponding to four articulatable parts of the laser printer in accordance with various embodiments.

FIG. 8A is an image showing original point cloud1, which corresponds to the non-articulated configuration of laser printer 500. FIG. 8B is an image showing the articulatable part 502 rendered in place. FIG. 8C is an image showing the clustering result, which includes numerous individual noise clusters 802 and a point cluster associated with the articulatable part 502 (e.g., the front door of the laser printer 500). FIG. 8C shows the remaining point cloud2 corresponding to the articulatable part 502. In FIG. 8C, the original point cloud1 (lighter gray scale) is annotated to include the remaining points of point cloud2 corresponding to the articulatable part 502, which can be articulated.

Figure 8E:
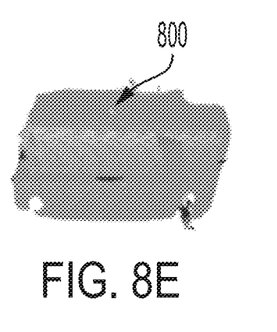
FIG. 8E is an image showing the remaining points corresponding to the articulatable part after all points not belonging to the cluster of points corresponding to the articulatable part have been deleted from the clustering result shown in FIG. 8C in accordance with various embodiments.

Identifying the articulatable part 502 in the clustering result shown in FIG. 8C involves distinguishing the cluster of points associated with the articulatable part 502 from noise point clusters 802. In some embodiments, distinguishing the cluster of points associated with the articulatable part 502 from noise point clusters 802 involves input from a human annotator. For example, the human annotator is asked during point cloud processing (e.g., step 420 in FIG. 4) to mark a point 800 corresponding to the articulatable part 502 in original point cloud1 shown in FIG. 8A. The point cluster in the clustering result shown in FIG. 8B that point 800 belongs to is the set of points belonging to the articulatable part 502. All points not belonging to the cluster of points corresponding to the articulatable part 502 can be deleted from the clustering result shown in FIG. 8C, resulting in the image shown in FIG. 8E. As a result, the remaining point cloud2 (e.g., FIG. 8E) includes only the set of points belonging to the articulatable part 502.

According to some embodiments, identifying the articulatable part 502 in the clustering result shown in FIG. 8B involves algorithmically distinguishing the cluster of points associated with the articulatable part 502 from noise point clusters 802. This approach does not involve or require input from a human annotator. Distinguishing the cluster of points associated with the articulatable part 502 from the noise point clusters 802 involves algorithmically determining a size of each of the clusters of points and selecting the largest point cluster as the cluster of points associated with the articulatable part 502.

The processes described above can be performed on a physical object having a multiplicity of articulatable parts. The articulatable parts can be identified as described above using M 3D point clouds corresponding to N articulatable parts and a reference point cloud corresponding to the physical object prior to articulation of the articulatable parts. FIG. 8D, for example, is an image showing point cloud1 corresponding to a laser printer 500 (non-articulated configuration) annotated with processed point clouds corresponding to four articulatable parts 502, 804, 806, 808 of the laser printer 500. The articulatable parts include the front door 502, a top cover 804, a front panel 806, and an envelope feed tray 808, each of which can be articulated.

Figure 9:
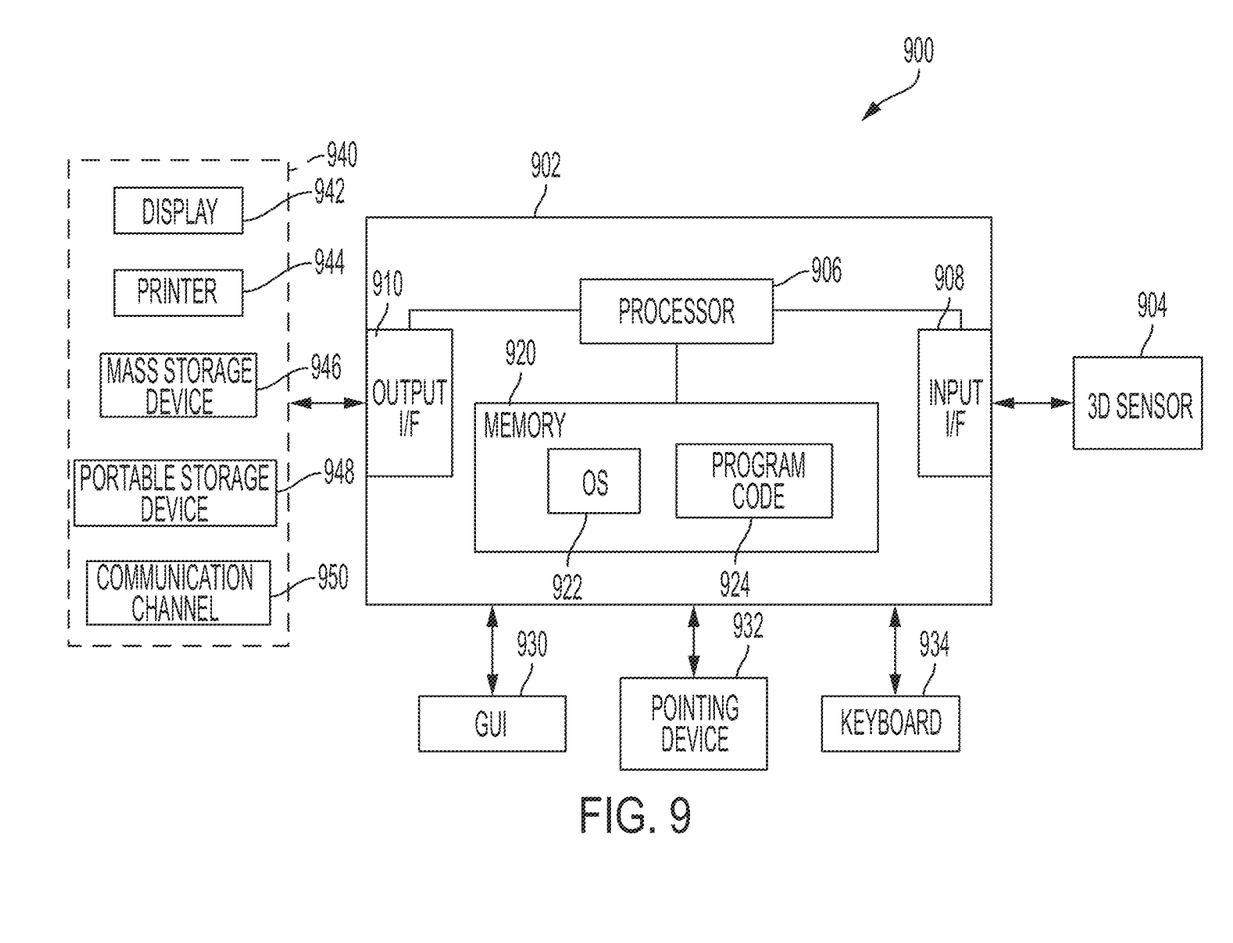
FIG. 9 is a block diagram of a system configured to identify one or more articulatable parts of a physical object using multiple 3D point clouds in accordance with various embodiments.

FIG. 9 is a block diagram of a system 900 configured to identify one or more articulatable parts of a physical object using multiple 3D point clouds in accordance with various embodiments. The system 900 is configured to implement the processes described hereinabove, including those illustrated in FIGS. 1-4. The system 900 includes a computing device 902 communicatively coupled to a 3D sensor 904. In some embodiments, the computing device 902 and the 3D sensor 904 are components of a unitary or common apparatus. In other embodiments, the 3D sensor 904 is a component separate from the computing device 902, and is communicatively coupled to the computing device 902 via an input interface 908.

The computing device 902 is representative of a variety of different computing devices including, for example, a smartphone, a tablet, a phablet, a laptop or other portable or desktop computer. The 3D sensor 904 is representative of a variety of different 3D scanning devices including, for example, an infrared or structured light 3D scanner, a 3D LIDAR scanner, a confocal or 3D laser scanner, a conoscopic holographic scanner, a modulated light 3D scanner, a time-of-flight 3D laser scanner, or a triangulation-based 3D laser scanner. The 3D sensor 904 can be a hand-held scanner or a tripod-supported 3D scanner. A suitable commodity 3D sensor 904 is the Structure Sensor for tablets and smartphones available from Occipital, Inc., San Francisco Calif.

The computing device 902 includes a processor 906 coupled to the input interface 908 and an output interface 910. The input interface 908 and the output interface 910 can be configured as a wired interface or a wireless interface (e.g., a Bluetooth® or IEEE 802.11 compliant transceiver). The processor 906 can be representative of one or any combination of one or more multi-core processors, general purpose microprocessors, special purpose microprocessors, digital signal processors (DSPs), filters, and other digital logic circuitry (e.g., ASICs, FPGAs, ASSPs). The processor 906 is operatively coupled to memory 920, which may include one or more of ROM, RAM, SDRAM, NVRAM, EEPROM, and FLASH. The memory 920 is configured to store an operating system 922 comprising software that supports the basic functions of the computing device 902, such as scheduling tasks, executing applications, and controlling peripherals. The memory 920 is also configured to store code or instructions 924 in the form of software and/or firmware to be executed by the processor 906 for implementing the processes and algorithms described herein.

The computing device 902 can include a graphical user interface (GUI) 930, which may include or take the form of a touchscreen. The computing device 902 may include or be communicatively coupled to other user input devices, such as a pointing device 932 and/or a keyboard 934. The computing device 902 may be communicatively coupled to one or more output devices 940 via the output interface 910. The output devices 940 can include one or more of a display 942, a printer 944, a mass storage device 946, a portable storage device 948, and a communication channel 950.

In accordance with various embodiments, the input interface 908 is configured to receive a first 3D point cloud generated by the 3D sensor 904 associated with a physical object having at least one articulatable part. The first point cloud is associated with the physical object prior to articulation of the articulatable part. The input interface 908 is also configured to receive a second 3D point cloud generated by the 3D sensor 904 associated with the physical object after articulation of the articulatable part. The memory 920 is operably coupled to the input interface 908 and configured to store the first and second point clouds and program code 924. The processor 906 is operably coupled to the input interface 908, the output interface 910, and the memory 920. The program code 924, when executed by the processor 906, causes the processor 906 to align the first and second point clouds, find nearest neighbors of points in the first point cloud to points in the second point cloud, and eliminate the nearest neighbors of points in the second point cloud such that remaining points in the second point cloud comprise points associated with the articulatable part and points associated with noise. The program code 924, when executed by the processor 906, causes the processor 906 to generate an output comprising at least the remaining points of the second point cloud associated with the articulatable part without the noise points, and communicate the output to the output interface 910. The output can comprise one or more of a graphical output, a data structure output, and an information signal, which can be communicated from the output interface 910 to one or more of the output devices 940.

In general, the processing methodologies and algorithms described herein may be implemented in hardware, software, firmware, or any combination thereof. Various features described or illustrated as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset. Accordingly, the term "processor," as used herein may refer to any of the foregoing structures or any other structure suitable for implementation of the techniques described herein.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A computer-implemented method, comprising:
    obtaining a first three-dimensional point cloud associated with a physical object having at least one articulatable part, the first point cloud associated with the physical object prior to articulation of the articulatable part;
    obtaining a second three-dimensional point cloud associated with the physical object after articulation of the articulatable part;
    coarsely aligning the first and second point clouds;
    finely aligning the first and second point clouds after coarsely aligning the first and second point clouds;
    eliminating, after finely aligning the first and second point clouds, points in the second point cloud such that remaining points in the second point cloud comprise at least points associated with the articulatable part; and
    generating an output comprising at least the remaining points of the second point cloud associated with the articulatable part.

2. The method of claim 1, wherein eliminating points in the second point cloud comprises:
    finding nearest neighbors of points in the first point cloud to points in the second point cloud; and eliminating the nearest neighbors of points in the second point cloud such that remaining points in the second point cloud comprise at least points associated with the articulatable part.

3. The method of claim 1, wherein:
eliminating points in the second point cloud comprises eliminating points in the second point cloud such that remaining points in the second point cloud comprise points associated with the articulatable part and points associated with noise; and
generating the output comprises generating the output comprising at least the remaining points of the second point cloud associated with the articulatable part without the noise points.

4. The method of claim 1, wherein:
eliminating points in the second point cloud comprises:
finding nearest neighbors of points in the first point cloud to points in the second point cloud; and
eliminating the nearest neighbors of points in the second point cloud such that remaining points in the second point cloud comprise at least points associated with the articulatable part and points associated with noise; and
generating the output comprises generating the output comprising at least the remaining points of the second point cloud associated with the articulatable part without the noise points.

5. The method of claim 1, further comprising:
applying clustering to the remaining points in the second point cloud to produce noise point clusters and a cluster of points associated with the articulatable part; and
distinguishing the cluster of points associated with the articulatable part from the noise point clusters;
wherein the output comprises at least the cluster of points associated with the articulatable part without the noise point clusters.

6. The method of claim 5, wherein distinguishing the cluster of points associated with the articulatable part from the noise point clusters comprises:
receiving a user input identifying a location of the articulatable part in the first point cloud; and
selecting a cluster of points at the user identified location as the cluster of points associated with the articulatable part.

7. The method of claim 1, wherein coarsely aligning the first and second point clouds comprises:
computing Fast Point Feature Histogram (FPFH) descriptors from the first and second point clouds; and
performing random sample consensus (RANSAC) registration between the first and second point clouds using the FPFH descriptors of the first and second point clouds.

8. The method of claim 7, comprising downsampling the first and second point clouds prior to computing the FPFH descriptors.

9. The method of claim 1, wherein finely aligning the first and second point clouds comprises performing Iterative Closest Point (ICP) registration on the coarsely aligned first and second point clouds.

10. The method of claim 1, wherein:
the output comprises points of the second point cloud associated with the articulatable part superimposed on the first point cloud; and
the output comprises one or both of a graphical output and a data structure output.

11. An apparatus, comprising:
an input interface and an output interface, the input interface configured to receive:
a first three-dimensional point cloud associated with a physical object having at least one articulatable part, the first point cloud associated with the physical object prior to articulation of the articulatable part; and
a second three-dimensional point cloud associated with the physical object after articulation of the articulatable part;
memory operably coupled to the input interface and configured to store the first and second point clouds and program code; and
a processor operably coupled to the input interface, the output interface, and the memory, the program code when executed by the processor causing the processor to:
coarsely align the first and second point clouds;
finely align the first and second point clouds after coarsely aligning the first and second point clouds;
eliminate, after finely aligning the first and second point clouds, points in the second point cloud such that remaining points in the second point cloud comprise at least points associated with the articulatable part;
generate an output comprising at least the remaining points of the second point cloud associated with the articulatable part; and
communicate the output to the output interface.

12. The apparatus of claim 11, wherein the processor is configured to:
find nearest neighbors of points in the first point cloud to points in the second point cloud; and
eliminate the nearest neighbors of points in the second point cloud such that remaining points in the second point cloud comprise at least points associated with the articulatable part.

13. The apparatus of claim 11, wherein the processor is configured to:
eliminate points in the second point cloud such that remaining points in the second point cloud comprise points associated with the articulatable part and points associated with noise; and
generate the output comprising at least the remaining points of the second point cloud associated with the articulatable part without the noise points.

14. The apparatus of claim 11, wherein the processor is configured to:
find nearest neighbors of points in the first point cloud to points in the second point cloud;
eliminate the nearest neighbors of points in the second point cloud such that remaining points in the second point cloud comprise at least points associated with the articulatable part and points associated with noise; and
generate the output comprising at least the remaining points of the second point cloud associated with the articulatable part without the noise points.

15. The apparatus of claim 11, wherein the processor is configured to:
apply clustering to the remaining points in the second point cloud to produce noise point clusters and a cluster of points associated with the articulatable part; and
distinguish the cluster of points associated with the articulatable part from the noise point clusters;
wherein the output comprises at least the cluster of points associated with the articulatable part without the noise point clusters.

16. The apparatus of claim 15, wherein the processor is configured to distinguish the cluster of points associated with the articulatable part from the noise point clusters by:
   receiving a user input identifying a location of the articulatable part in the first point cloud; and
   selecting a cluster of points at the user identified location as the cluster of points associated with the articulatable part.

17. The apparatus of claim 11, wherein the processor is configured to coarsely align the first and second point clouds by:
   computing Fast Point Feature Histogram (FPFH) descriptors from the first and second point clouds; and
   performing random sample consensus (RANSAC) registration between the first and second point clouds using the FPFH descriptors of the first and second point clouds.

18. The apparatus of claim 17, wherein the processor is configured to downsample the first and second point clouds prior to computing the FPFH descriptors.

19. The apparatus of claim 11, wherein the processor is configured to finely align the first and second point clouds by performing Iterative Closest Point (ICP) registration on the coarsely aligned the first and second point clouds.

20. The apparatus of claim 11, wherein:
   the output generated by the processor comprises points of the second point cloud associated with the articulatable part superimposed on the first point cloud; and
   the output comprises one or both of a graphical output and a data structure output.

* * * * *